(No Model.) 2 Sheets—Sheet 2.
O. CHYTRÆUS.
STARTING ALTERNATING MOTOR.
No. 535,530. Patented Mar. 12, 1895.
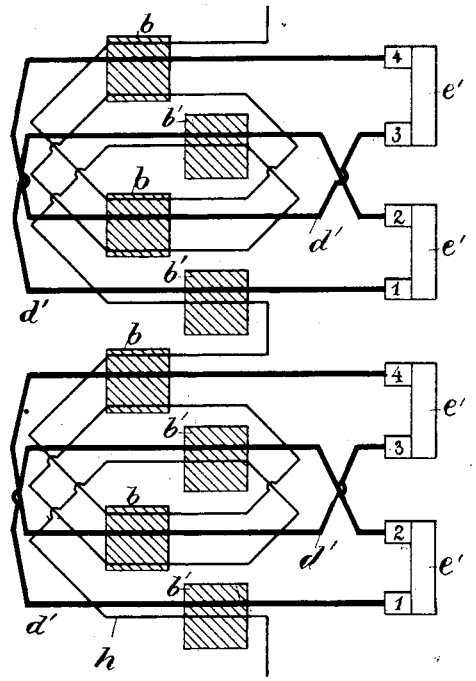
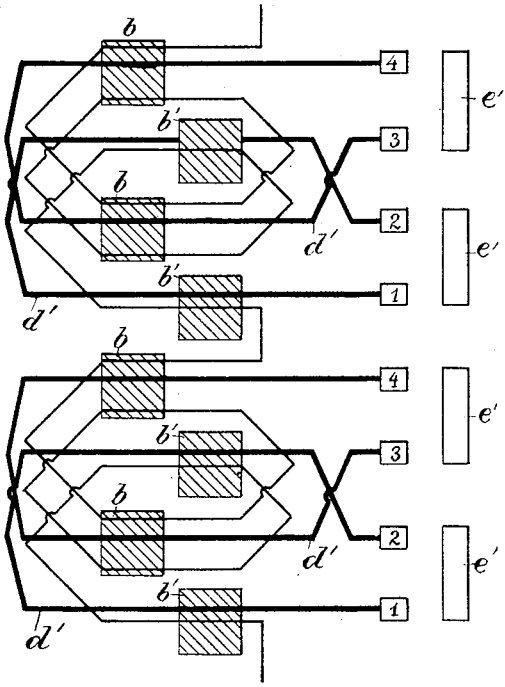
Fig. 7. Fig. 8.
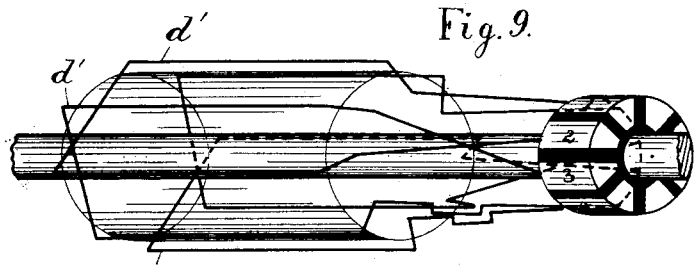
Fig. 9.
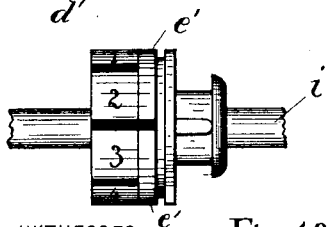
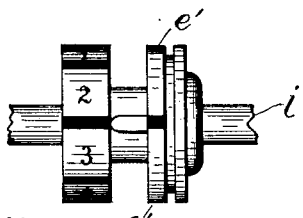
WITNESSES: Fig. 10. Fig. 11. INVENTOR
Emma C. Dughnée. Ossian Chytræus
A. L. Pfaff. BY Edward P. Thompson
ATTORNEY.

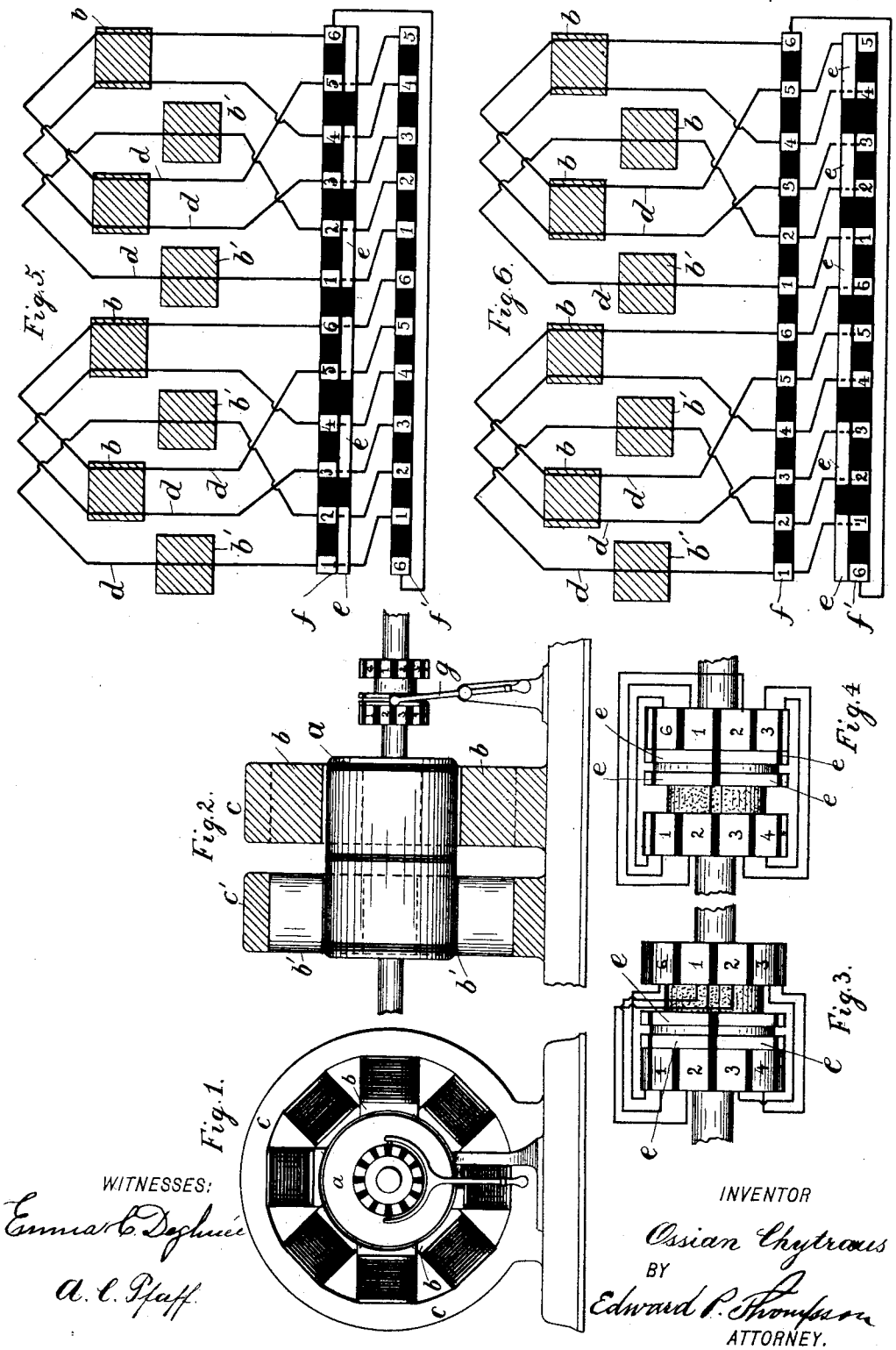

UNITED STATES PATENT OFFICE.

OSSIAN CHYTRÆUS, OF PITTSFIELD, MASSACHUSETTS.

STARTING ALTERNATING MOTOR.

SPECIFICATION forming part of Letters Patent No. 535,530, dated March 12, 1895.

Application filed December 4, 1894. Serial No. 530,766. (No model.)

*To all whom it may concern:*

Be it known that I, OSSIAN CHYTRÆUS, a subject of the King of Sweden and Norway, and a resident of Pittsfield, county of Berkshire, and State of Massachusetts, have invented certain new and useful Improvements in Starting Electric Motors, of which the following is a specification.

Heretofore it has been proposed to construct a polyphase electric motor with a single armature and field magnets arranged along the length of the same and acting on different portions of the armature windings, and at the same time so arranged that first one magnet pole acts upon a certain wire or group of wires of the armature and then as the armature turns another field magnet pole acts upon that wire or those wires. For this purpose the magnet poles are shifted circularly with reference to each other. The exact nature of this construction and the operation of the construction relating to my invention, appears more fully described by reference to drawings hereinafter.

I find that although motors constructed with field magnets of the above nature run satisfactorily after being started, but a great deal of difficulty is experienced from the fact that the motors will not start automatically sufficiently well to recommend them to the usual and all practical purposes.

My invention consists in providing simple means for accomplishing the effective and satisfactory automatic starting of the motor.

Figure 1 is a side elevation of a complete motor constructed according to my invention, but the detailed construction of the invention itself does not clearly appear in this figure. Fig. 2 is a vertical section in part of the device shown in Fig. 1. Fig. 3 is an enlarged representation in elevation and partly in diagram of some of the electrical connections involved in the device shown in Figs. 1 and 2 when at a certain phase, namely, at the starting phase. Fig. 4 shows the same as Fig. 3, except that the phase is that of full running speed. Fig. 5 is a diagram of the electrical connections of the armature coils and means for putting them in a condition for starting. It shows the starting phase of the circuits. Fig. 6 is a diagram similar to that shown in Fig. 5 except that the circuits are such that the motor is in a condition for running at full speed. Figs. 7 and 8 are similar views to those seen in Figs. 5 and 6 of a modification of the arrangement of the circuits for starting the motor. Fig. 9 is a perspective of the coils of the armature arranged around the armature shaft, which is provided with insulated terminals for certain coils of the armature. Fig. 10 shows these terminals in combination with a movable contact piece all in side elevation. Fig. 11 is the same as that shown in Fig. 10, except that the contact piece for changing the circuits has a different phase.

$a$, is an armature of an electric motor.

$b$, represents the poles of one of the field magnets $c$, and $b'$, represents the poles of another field magnet $c'$.

The coils of the armature are lettered, $d$. They and the surfaces of the poles of the magnet are evolved upon a plane in Figs. 5 and 6, so as to show that the poles, $b\ b'$, of the respective magnets are circularly shifted across the active portion of the armature coils, which during motion come alternatively within inductive action with the poles $b\ b'$, of the respective field magnets.

In Fig. 5 the coils, $d$, are respectively closed upon themselves, while in Fig. 6 they are connected up in series. This change is effected by means of conductors, $e$, movable from one series of armature terminals 1, 2, 3, 4, 5, 6 and 1, 2, 3, 4, 5, 6, arranged in the line, $f$, and a second series of terminals similarly numbered, arranged in the line, $f'$. This may be more clearly understood by following the coils in Fig. 5 and then in Fig. 6. In the former the closed circuit is from the terminal 1, in the line, $f$, around and through the coil, $d$, to the terminal 2 in line, $f$, through the conductor, $e$, and back to the terminal $f$. In other words this coil, $d$, farthest to the left as explained, is closed upon itself by the conductor, and similarly in regard to the other coils of the armature.

In Fig. 6, the circuit is from the terminal 1 in line, $f'$, to the terminal 1 in line, $f$, through the coil, $d$, farthest to the left, to the terminal 2 in line $f$, to the terminal 2 in line $f'$ through one of the conductors, $e$, to the terminal 3 in line $f$, through the second coil, $d$, to the terminal 4 in line $f$, to the terminal 4 in line $f'$, and so on to the terminal 6 in line $f$, back again to the terminal 6 in line $f'$ so that all the coils, $d$, are arranged in series merely by shifting the conductors, $e'$, from the position shown in Fig. 5 to the position shown in Fig. 6. The exact change consists in moving the conductors, $e$, which are of sufficient length to span and connect two consecutive terminals of each coil to the position where they connect two terminals of different coils. These conductors, $e$, are shown all fastened together and arranged in a circle, while the terminals of the coils are also arranged in circles in the nature of a commutator. A handle, $g$, having suitable connection with the conductors $e$, serves to shift the said conductors to one side or the other so as to throw the coils properly in circuit.

The operation consists in passing an alternating current through the field magnets. A current is introduced in the coils, $d$, while closed upon themselves, thereby obtaining a powerful torque, which causes a quickly accelerating rotation of the armature. As soon as sufficient speed has been produced in the armature, the handle, $g$ is rotated so as to throw the circuits of the armature coils from the condition shown in Fig. 5 to the condition shown in Fig. 6. Then the armature continues to maintain its speed and power the same as if it had been started by hand or some auxiliary motor or some other as if it had been started very slowly and with practically no power.

A modification consists in providing the armature, as usual, with a coil, $h$, wound about the same in many convolutions which are in series with one another. In combination with this coil there are supplementary coils $d'$, having conductors $e'$ movable so, as to throw the terminals of the coil in and out of circuit with said conductors, so that when they are in circuit with said conductors, they are closed respectively upon themselves and when the conductors are removed, as in Fig. 8, the coils, $d'$ are open. In practice, the terminals of the coils and the conductors, $e'$, are arranged in circuits as in Figs. 10 and 11, and while the terminals 1, 2, 3, 4, &c., are fixed upon the armature shaft $i$, the conductors, $e$, are movable thereon to and from the said terminals. The difference in the operation of this modification over the description of the former device is that the starting of the motor is effected by destroying the reaction of the armature by having the supplementary coils $d'$, closed upon themselves while starting and open, as in Figs. 8 and 11, during full speed.

I claim as my invention—

1. The combination with an electric current motor having field magnet poles circularly shifted relatively to one another about the armature, of means for changing some of the coils from being closed respectively upon themselves to being open, the remaining coils being in circuit with one another.

2. The combination with an electric current motor, having field magnet poles, circularly shifted relatively to one another about the armature, of means for changing the coils from being closed respectively upon themselves to being closed in series with one another, said means consisting of a double set of terminals for each coil and electric conductors connecting respectively the terminals of each coil and adapted to be moved so as to connect respectively the terminals of different coils and to leave the terminals of the same coil open.

3. The combination with an electric current motor having field magnet poles, circularly shifted relatively to one another about the armature, of means for changing some of the armature coils from being closed respectively upon themselves to being open, the remaining coils being in circuit with one another, said means consisting of electric conductors connecting the terminals of the first named coils, and adapted to move out of contact with the same.

4. The combination with an alternating electric current motor having field magnet poles, an armature whose coils are within inductive action of the poles, and means for changing some of the coils from being closed respectively upon themselves to being open, the remaining coils being in circuit with one another.

5. The combination with an alternating electric current motor having field magnet poles, an armature whose coils are within inductive action of the poles, and means for changing some of the coils from being closed respectively upon themselves to being open, the remaining coils being in series circuit with one another.

In testimony that I claim the foregoing as my invention, I have signed my name, in presence of two witnesses, this 1st day of December, 1894.

OSSIAN CHYTRÆUS. [L. S.]

Witnesses:
   CHARLES W. SLOPER. [L. S.]
   MARTIN P. GAYLORD. [L. S.]